(12) United States Patent
Gneuss et al.

(10) Patent No.: US 11,986,989 B2
(45) Date of Patent: May 21, 2024

(54) FILTERING DEVICE FOR HIGHLY VISCOUS MEDIA

(71) Applicant: GNEUSS GmbH, Bad Oeynhausen (DE)

(72) Inventors: Daniel Gneuss, Charlotte, NC (US); Detlef Gneuss, Carabietta (CH); Stephan Gneuss, Bad Oeynhausen (DE)

(73) Assignee: Gneuss GmbH, Bad Oeynhausen (DE)

( * ) Notice: Subject to any disclaimer, the term of this patent is extended or adjusted under 35 U.S.C. 154(b) by 638 days.

(21) Appl. No.: 17/181,421

(22) Filed: Feb. 22, 2021

(65) Prior Publication Data
US 2021/0170663 A1 Jun. 10, 2021

Related U.S. Application Data

(63) Continuation of application No. PCT/DE2019/100756, filed on Aug. 22, 2019.

(30) Foreign Application Priority Data

Aug. 22, 2018 (DE) ...................... 10 2018 120 445.0

(51) Int. Cl.
*B29C 48/69* (2019.01)
*B29B 7/58* (2006.01)
(Continued)

(52) U.S. Cl.
CPC ...... *B29C 48/6914* (2019.02); *B29C 48/2545* (2019.02); *B29C 48/2554* (2019.02);
(Continued)

(58) Field of Classification Search
CPC ............ B29C 48/6914; B29C 48/2545; B29C 48/2554; B29C 48/256; B29C 48/2725; B29B 7/58
(Continued)

(56) References Cited

U.S. PATENT DOCUMENTS 4,025,434 A * 5/1977 Mladota ................ B29C 48/256
425/197
5,090,887 A * 2/1992 Gneuss ............... B29C 48/6914
425/185
(Continued)

FOREIGN PATENT DOCUMENTS

CN 203680783 U 7/2014
DE 10 2005 061 770 A1 7/2007
(Continued)

*Primary Examiner* — Fred Prince
(74) *Attorney, Agent, or Firm* — Muncy, Geissler, Olds & Lowe, P.C.

(57) ABSTRACT

A filtering device for highly viscous media, in which filtering device a rotatably mounted screening wheel which has a plurality of screening cavities is arranged between a front housing element and a rear housing element. According to the invention, a plurality of screening cavities lying beside one another, through which flow can pass jointly, are combined into at least one filter group. To this end, on both sides beside the filter group, a closed blocking segment is provided on the screening wheel which segment, when positioned in associated blocking regions of the housing, is sealed off with respect to the housing elements on both sides of the screening wheel. The blocking regions in the housing are in each case larger than or as large as a screening cavity together with a sealing web surrounding the same.

12 Claims, 8 Drawing Sheets

(51) Int. Cl.
*B29C 48/25* (2019.01)
*B29C 48/255* (2019.01)
*B29C 48/27* (2019.01)
*B29C 48/691* (2019.01)

(52) U.S. Cl.
CPC ........ *B29C 48/256* (2019.02); *B29C 48/2725* (2019.02); *B29B 7/58* (2013.01)

(58) Field of Classification Search
USPC ................................. 210/330; 425/197, 199
See application file for complete search history.

(56) References Cited

U.S. PATENT DOCUMENTS

| | | | |
|---|---|---|---|
| 6,582,598 B2* | 6/2003 | Patrovsky | B01D 29/54 210/493.1 |
| 6,843,915 B2 | 1/2005 | Gneuss | |
| 9,539,753 B2 | 1/2017 | Middler et al. | |
| 2008/0179261 A1* | 7/2008 | Patrovsky | B29C 48/6914 210/324 |
| 2010/0276353 A1* | 11/2010 | Patrovsky | B29C 48/6914 210/236 |

FOREIGN PATENT DOCUMENTS

| | | |
|---|---|---|
| DE | 10 2010 036 810 A1 | 2/2012 |
| DE | 10 2016 113 979 B3 | 11/2017 |
| EP | 1 369 219 A1 | 12/2003 |
| JP | 2012-239999 A | 12/2012 |
| WO | WO 2018/019336 A1 | 2/2018 |

\* cited by examiner

FILTERING DEVICE FOR HIGHLY VISCOUS MEDIA

This nonprovisional application is a continuation of International Application No. PCT/DE2019/100756, which was filed on Aug. 22, 2019 and which claims priority to German Patent Application No. 10 2018 120 445.0, which was filed in Germany on Aug. 22, 2018 and which are both herein incorporated by reference.

BACKGROUND OF THE INVENTION

Field of the Invention

The present invention relates to a filtering device for highly viscous media.

Description of the Background Art

For separation of dirt particles out of highly viscous media, such as in particular molten plastic, different designs, such as screen plunger changer or screen wheel changer, which share the feature that they provide, on a movable bearing element, multiple screen cavities in which filter media are introduced are known. If a screen point is fouled, the screen point in question is moved out of the flow channel and another screen point is moved into said flow channel there. In the case of designs which allow continuous operation, it is consequently ensured that, during the screen change at one of the screen cavities, the liquid can continue to flow at least via a further screen cavity. The fouled screen point is subsequently brought into a backflushing position and cleaned by backflushing. If the cleaning by backflushing is not sufficient, the screen cavity is moved into a maintenance position outside the housing, or is accessible there by way of a housing opening, so that the screen element can be exchanged.

The continuous mode of operation allows permanent, reliable filtering operation, but in some usage cases is associated with the following disadvantages:

For all designs, one problem is that a large number of molten plastics can undergo chemical and/or thermal degradation if the residence time over which the molten plastic is stationary outside the flowed-through flow channel in the screen cavities while under the influence of temperature is excessively long.

For a filtering device of the screen plunger changer type, the filter surface cannot be enlarged arbitrarily. For the purpose of keeping a screen element in use, having a further one available in reserve, and moreover also providing at least one backflushing position and/or one maintenance position for changing the screen elements, usually at least four screen cavities are required. A significant surface enlargement in the screen cavities would lead to disproportionately large screen plunger diameters and housing lengths. Surface enlargement through the use of cartridge filters and suchlike is likewise possible only conditionally owing to the limited structural space in the plunger.

In the case of the screen wheel type which is described for example in DE 10 2016 113 979 B3, there is likewise a limitation on the surfaces usable on the screen wheel for the filtration, because each screen cavity has to be individually sealed off with respect to the housing. Although it is possible for multiple screen points to be flowed through simultaneously, as disclosed in DE 10 2010 036 810 A1, which corresponds to U.S. Pat. No. 9,539,753, during the filtering operation, there are always at least two further screen points positioned within the housing, specifically at least one before and one after the flowed-through screen cavities. The covering by the housing by the width of at least in each case one screen cavity on both sides is necessary to prevent liquid flowing out of the housing upon further rotation of the screen wheel. These screen cavities situated effectively in a blocking position are particularly susceptible to the stated problem of degradation for molten plastics which are stationary while under the influence of heat. Of these, in turn, that position on the screen wheel which is in each case situated, in the direction of rotation, directly behind the positions present during the filtering operation, is the one where the greatest risk occurs. This is because the melt which is stationary therein passes directly into the production flow upon the next advancement. If degradation products form on the clean side of the screen element during the residence time, these directly contaminate the product.

In order, nevertheless, to be able to work with significantly larger filter surfaces, large-surface filters are known, for example from DE 10 2005 061 770 A1, said filters however having to be rendered completely inactive for maintenance.

SUMMARY OF THE INVENTION

It is therefore an object of the present invention to provide a filtering device for highly viscous media for highly viscous media of the type mentioned in the introduction in such a way that the effective filter surface is increased, with the problem of thermal decomposition of specific molten plastics, however, being simultaneously taken into consideration.

The solution according to the invention is therefore based on a filtering device of the screen wheel type.

The screen wheel can be still divided into multiple circular ring segments of which the majority are broken through and form screen cavities. The screen cavity itself may have the shape of a circular ring segment, so that optimal use of space is made, but may also be round. The term "segment" therefore refers first of all to only one of multiple positions on the screen wheel.

Multiple segments situated one next to the other that have screen cavities form a filter group which can be flowed through as a whole unit, with the result that a large surface is available for filtering.

Although, during filtering, the screen cavities are used as a unit made up of multiple circular ring segments, they are nevertheless all provided with a separate peripheral sealing web via which they can be individually sealed off with respect to the housing. If the screen cavities in the screen wheel have to be cleaned, the screen wheel can, during ongoing operation, be rotated without melt escaping from the housing. The surface of the filter group is then temporarily reduced, but the filtering can continue. The screen cavities are individually accessible one after the other at a maintenance opening before being rotated back into the housing so as to allow the entire filter group to be flowed through again.

In the blocking positions, which at the same time are unused waiting positions and are in each case situated before and after the filter group, no screen cavities whatsoever are provided. Although, in this way, there is a small amount of surface on the screen wheel that cannot be used for the filtering, there are consequently no hollow spaces which are fixed in the housing over an extensive period while under the influence of heat and in which degradation of material can occur.

The term "sealing web" may refer specifically to an elevated region with constant width that surrounds a screen cavity. It is however also possible for an imaginary strip within a very much larger surface region, which imaginary strip has a minimum width required for the sealing action, to be involved. If, for example, a round screen cavity is provided in a segment, then a large sealing surface is available next to the round cavity. Of that, however, only some endless ring with a minimum width dependent inter alia on the viscosity of the medium and the pressure is required to bring about the sealing of the screen cavity with respect to the housing. The sealing web may directly surround such a screen cavity so that it, too, is round, or it may also be situated somewhere in the side surface of the screen wheel, said side surface not being broken through for a cavity. It is also possible for the entire remaining surface, not broken through, of the segment to serve as a sealing web. The manner in which the sealing web extends and how wide it is is thus not important. All that matters is that the required minimum width of the sealing web lies completely within the assigned segment surface, it also being possible for adjacent segments to have a common sealing web precisely in the boundary region, in order to maximize the surface area available for filtering.

The screen wheel may only have a single filter group, which actively uses more than half of the circular ring segments for filtering. There remain two circular ring segments as blocking segments, which are situated within the housing during normal operation, and therebetween a third circular ring segment with no screen cavity, which third segment occupies a maintenance position outside the housing. Thus, in summary, the screen wheel has a large segment, which constitutes the filter group formed from multiple, individually sealable screen cavities, and a small segment without screen cavities.

The number of angular subdivisions and of the resulting circular ring segments should be at least 6, but preferably between 8 and 12. As presented, there are always 3 positions which are not usable for the filtering operation, with the result that a minimum number of n=6 segments still makes half of the surface usable for the filtering operation. Where n=8, the ratio of usable to non-usable surface is up to 5:3, and where n=12, said ratio is even up to 9:3. The more segments there are, the smaller the surface reduction is too, if the screen wheel has already been rotated for the purpose of maintenance but the filtering operation is continued via a reduced filtering surface.

Although, theoretically, the stated ratio is continuously improved as the number of circular ring segments increases, because the number of non-usable positions remains constant at at least three, account has yet to be taken here of the fact that the filtering region is formed, according to the invention, from individual segments which each have to be independently sealable, with the result that it is always necessary to consider in between the width of a sealing web which, in turn, requires a constant minimum width irrespective of the usable filter surface. Thus, the greater the number of cavities is, the more surface remains non-usable as a sealing surface within the filter region. Based on these considerations, a subdivision of the screen wheel into significantly more than 12 cavities is not expedient.

Since the division of the screen wheel is therefore preferably realized into 8 to 12 circular ring segments, and of these it is necessary to have at least 3 segments—two as blocking segments and one for the maintenance opening—which are not usable for the filtering, the filter region consequently comprises at least 5 segments situated one next to the other. As a result, in all the screen wheel positions, there are always at least two screen cavities which can be flowed through, even while the blocking segment moves through the filter region.

Further, there may be provided two filter groups of equal size, between which, on both sides, in each case one individual blocking element is formed. In a manner matched to this, the housing opening in the maintenance region is of such a size that a complete filter group can be arranged outside the housing in order, there, for the screen elements in the screen cavities to be exchanged or cleaned. The housing consequently has a diabolo shape on the maintenance-opening side. There are consequently two filter groups on the screen wheel, which are alternately brought into the filter operation and into the maintenance position. The subdivision of the relatively large filter groups into individually sealable screen cavities has the advantage that melt cannot escape from the housing in any angular position of the screen wheel. The surface in the blocking regions that is covered by the housing is always at least as large as a circular ring segment, or even larger than this. Due to the subdivision into individual screen cavities, which as such is evident not in the region of the inflow channel and outflow channel during filter operation but only during further rotation through the blocking regions, quasi-continuous operation is possible, since the flow channel is not fully closed off in any position of the screen wheel.

Also, in a specific working position of the screen wheel, all the screen cavities of one filter group may be flowed through simultaneously and those of the other filter group are situated in the maintenance region. The switch therebetween is realized without a complete interruption of the fluid flow.

Insofar as reference is made in the description of the present invention to the shape of a circular ring segment, this generally relates to the subdivision of the screen wheel annular disk with central hub into a multiplicity of portions without the exact circular segment shape being important. Also, trapezoidal shapes or other approximations are suitable for the division into the portions on the screen wheel that are provided according to the invention.

Preferably, the imaginary or else—in the form of sealing web edges, etc.—visible separating lines between the segments extend as radial rays. It is also possible, however, for the actual separating line to be arranged offset with respect to a radius and/or for the circular ring segments to be formed with different sizes. For example, for increasing the sealing action, it may be advantageous for the blocking segments to be formed to be larger than the portions fitted with filter elements, the so-called screen cavities.

Finally, the openings in the screen wheel that are usable for the filtration, and are provided with screens and other filter elements, may also be not only circular segment-like but round too. The circular segment shape results in the best utilization of the available surface, round recesses and corresponding inserts such as cartridge filters or stacked filter disks also however being conceivable. What is important is that, irrespective of the specific shape of the screen openings, there is a contour and seal line on the inner sides, facing toward the screen wheel, of the housing parts, which contour and seal line can enclose and thus seal off multiple screen cavities. Within this contour line, the housing surface must not be interrupted by webs or the like, which is preferably achieved in that any webs present are broken through for example by overflow channels, or in that at the same time a full-area depression is formed on the inner surfaces of the housing halves.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
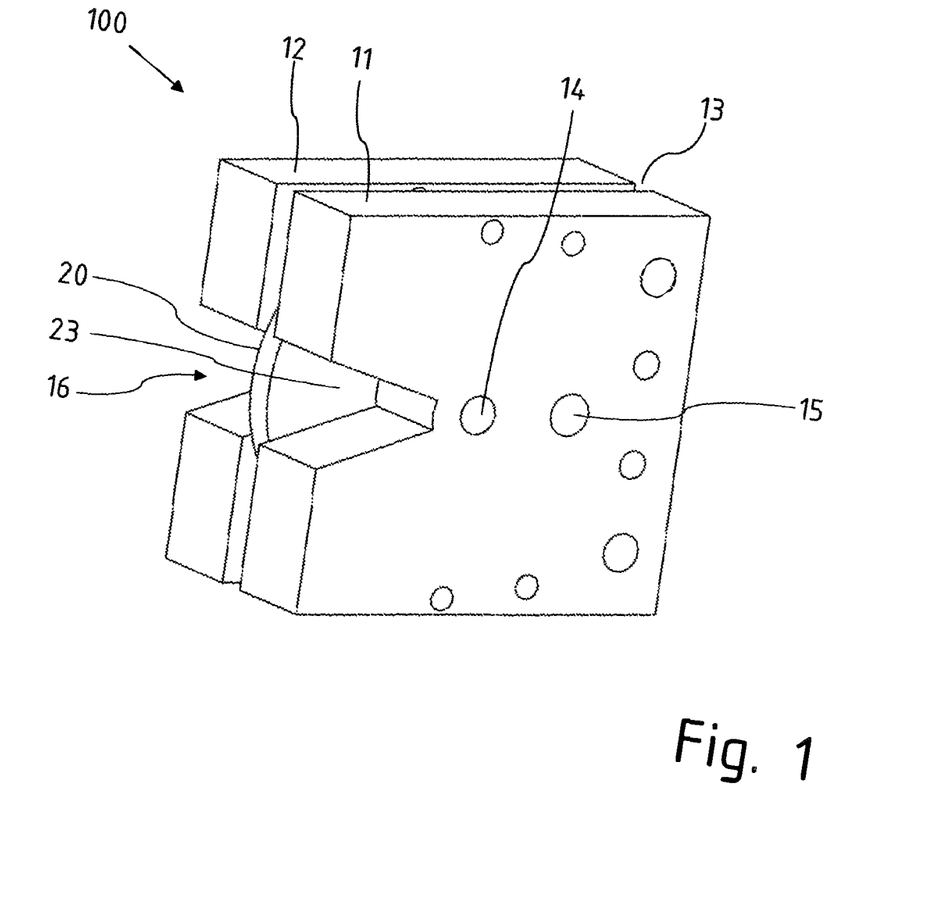
FIG. 1 shows a perspective view of a filtering device according to a first embodiment.

FIG. 1 shows a filtering device 100 according to an exemplary embodiment of the invention in a perspective view. The basic construction corresponds to the known type of a screen wheel changer filtering device and includes a housing 10, which has a plate-like front housing element 11 through which an inflow channel 15 passes and has a likewise plate-like, rear housing element 12 through which an outflow channel passes.

A screen wheel 20, which is arranged in a gap 13 between the housing elements 11, 12, which are arranged in a plane-parallel manner, and is rotatable about an axis of rotation 14.

What characterizes the invention is, in the case of the filtering device 100 according to FIG. 1, firstly a maintenance opening 16 in the housing 10 that is trapezoidal in a side view. Furthermore, the screen wheel 20 of the filtering device 100 differs from the prior art in that that part of the screen wheel 20 which is visible in the maintenance position 16 during the filtering operation is designed as a so-called blocking element 23, that is to say there are no screen cavities there.

Figure 2:
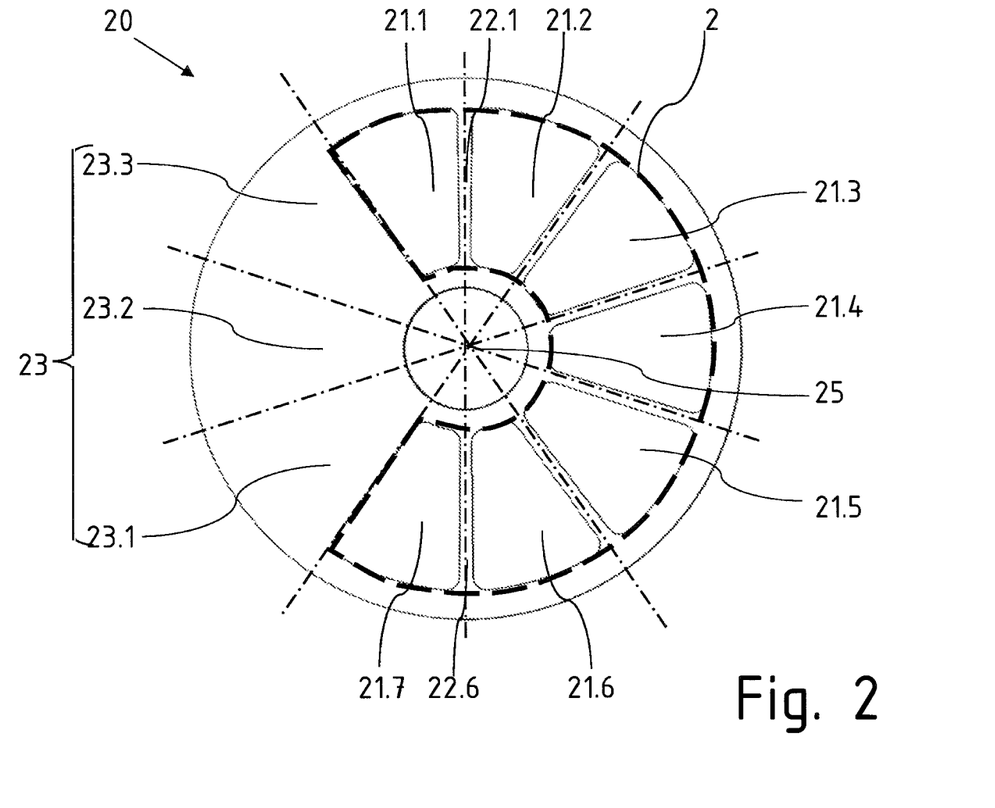
FIG. 2 shows, in plan view, a screen wheel for the filtering device according to an exemplary embodiment.

The screen wheel 20 is shown in plan view in FIG. 2. The basic configuration provides for the division of a circular ring zone around a central hub 25 into a number n of equal circular ring segments. In the exemplary embodiment illustrated in FIG. 2, n=10 was selected, with the result that each segment includes an angle of 36°. Three segments 23.1, 23.2, 23.2 together form the blocking segment 23. In all the other circular ring segments, there is formed in each case one screen cavity 21.1, ..., 21.7 having in each case one screen opening which extends through the entire width of the screen wheel 20 and which can be covered by a screen element. All the screen cavities 21.1, ..., 21.7 together form a filter group 2 which can be flowed through as a whole unit, although each screen cavity 21.1, ..., 21.7 is delimited at its periphery via a sealing web. For each individual screen cavity, the sealing web is made up of: an inner arcuate portion which extends around the hub 25; an outer arcuate portion at the outer boundary of the screen wheel 20; and at least one radial sealing web 22.1, ..., 22.6.

Adjacent screen cavities 21.1, ..., 21.7 have a common radial sealing web between them. The boundary-side screen cavities 21.1, 21.7 are each delimited to one side by radial edges of the blocking segment 23, which radial edges, in a functional sense, are likewise considered to be a sealing web in the context of the invention.

Figure 3:
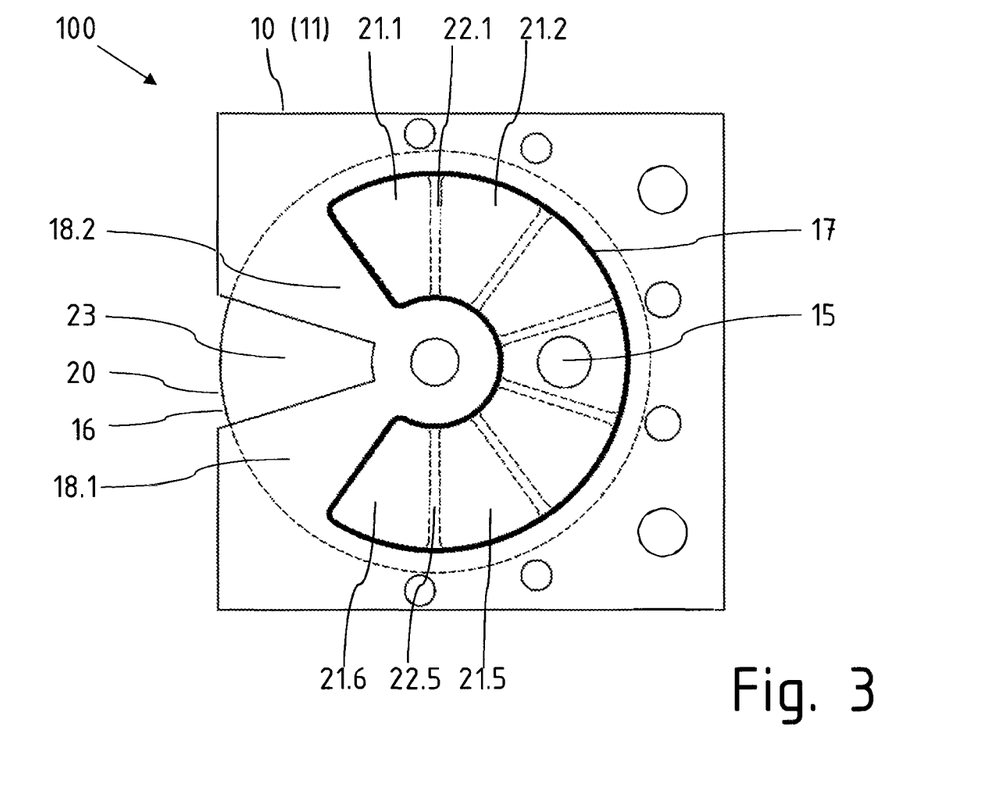
FIG. 3 shows a front view of the filtering device with a first position of the screen wheel.

FIG. 3 shows a plan view of the front housing element 11 of the housing 10, with the screen wheel 20, which is situated therebehind in a concealed manner, being additionally illustrated. In FIG. 3, the screen wheel 20 is in the production position for the filtering operation. The filter group 2 of the screen wheel 20 is in congruence with the filtering region 17 in the housing 10. What is involved here is a recess in the respective contact surface, facing toward the screen wheel 20, of the housing elements, which recess has a flow connection with the inflow channel 15 or, in the case of the rear housing element, with the outflow channel. Due to the depression in the filtering region 17, the radial sealing web portions 22.1, ..., 22.6 between the screen cavities 21.1, ..., 21.7 are flowed over, with the result that all the screen cavities 21.1, ..., 21.7 of the filter group 2 are flowed against together from a single inflow channel 15. The outflow side is formed analogously, so as to re-combine the liquid, such as in particular molten plastic, which has been filtered at different screen cavities 21.1, ..., 21.7, and to guide said liquid out of the housing 10 via an outflow channel.

Blocking regions 18,1, 18,2 are formed on the housing 10 on both sides of the maintenance opening 16. In said blocking regions, that surface of the housing elements which faces toward the screen wheel 20 is smooth and abuts almost directly against the sealing webs. Consequently, lateral outflow of the medium via the screen wheel 20 is ruled out. Although the blocking regions 18.1, 18.2 could, purely in order to achieve the blocking action, also be significantly narrower, they are kept in the described division of the screen wheel 20 into n=10 uniform circular ring segments.

Figure 4:
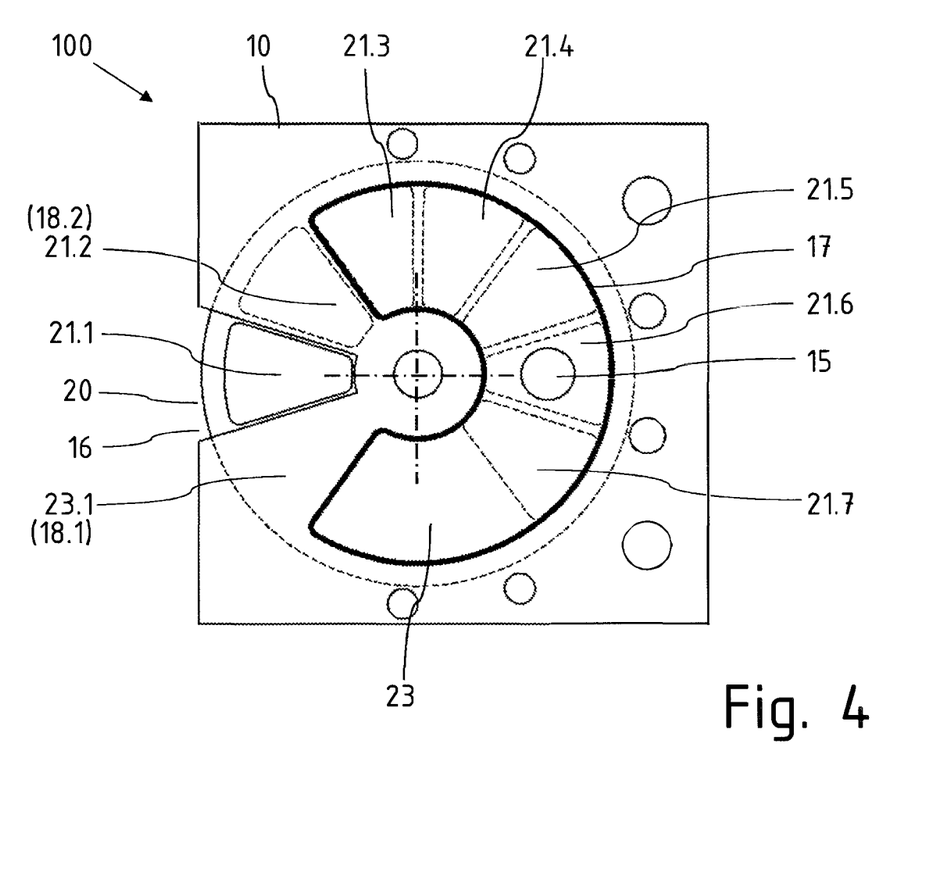
FIG. 4 shows a front view of the filtering device with a second position of the screen wheel.

The advantage of this division will become clear in the next illustration. In FIG. 4, the filtering device 100 is illustrated in a transition phase. In comparison with the position according to FIG. 3, the screen wheel 20 has been rotated through two angular increments, each of 36°, in the counterclockwise direction. Consequently, parts of the blocking segment 23 of the screen wheel 20 are now situated within the filtering region 17. The screen cavities 21.3, ..., 21.7 remain therein as usable filter surfaces. The filtering operation can thus be continued via the five remaining screen cavities 21.3, ..., 21.7.

Due to the rotation, the screen cavity 21.1 is placed in the region of the maintenance opening 16, so that, there, the screen element can be exchanged or cleaned. The trapezoidal shape of the maintenance opening 16 is necessary for saving as much space as possible and for having available, as blocking region 18.1, 18.2, the entire adjacent surface in the housing 10 according to a circular ring segment. The surface in the blocking region 18.1, 18.2 is thus at least as large as the extent of the sealing webs which surround the screen cavity 21.2, with the result that the screen cavities, together with sealing webs, are covered over the full area on both sides of the screen wheel plate. Due to the covering, precisely the one screen cavity 21.2 is sealed off. Although the screen cavity 21.2 is, in a structural sense, part of the commonly usable filter group 2, in this position, it is completely blocked and functionally separate from the filter group 2.

For further maintenance, the screen wheel 20 is always further rotated through an angular increment, with the result that the screen cavities 21.3, . . . , 21.7 appear at the maintenance opening 16 in steps. During this time, the blocking segment 23 is moved completely through the filtering region 17 one time.

Figure 5:
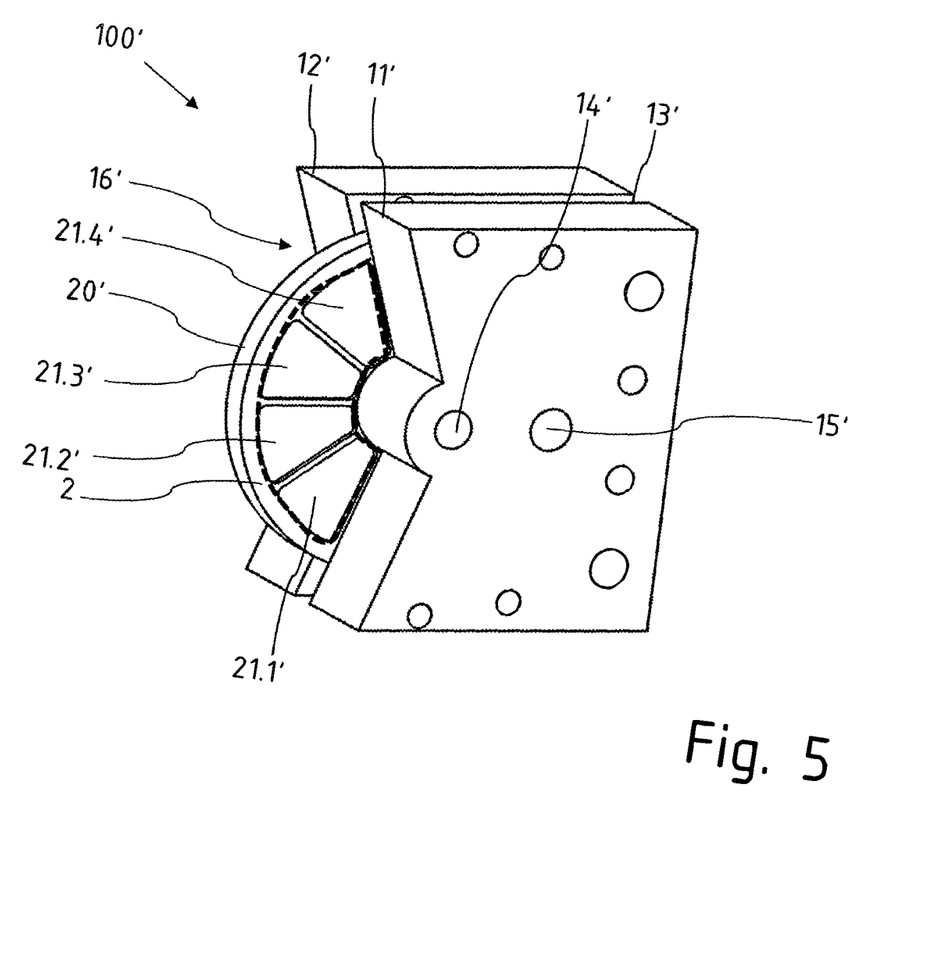
FIG. 5 shows a perspective view of a filtering device according to an exemplary embodiment.

FIG. 5 shows a filtering device 100' according to a second embodiment of the invention in a perspective view. The basic construction is also as in the first embodiment and comprises: a housing 10', which has a plate-like front housing element 11' through which an inflow channel 15' passes and has a likewise plate-like, rear housing element 12' through which an outflow channel passes; and a screen wheel 20', which is arranged in a gap 13' between the housing elements 11', 12', which are arranged in a plane-parallel manner, and is rotatable about an axis of rotation 14'.

What characterizes the invention is, in the case of the filtering device 100' according to FIG. 5, the maintenance opening 16' on the left-hand side of the housing 10' that is diabolo-like in a side view. That part of the screen wheel 20' which is visible in the maintenance position 16' during the filtering operation contains a complete filter group 2, which comprises four individual and separately blockable but also jointly usable screen cavities 21.1', . . . , 21.4' which, in the maintenance position 16', are all simultaneously openly accessible.

Figure 6:
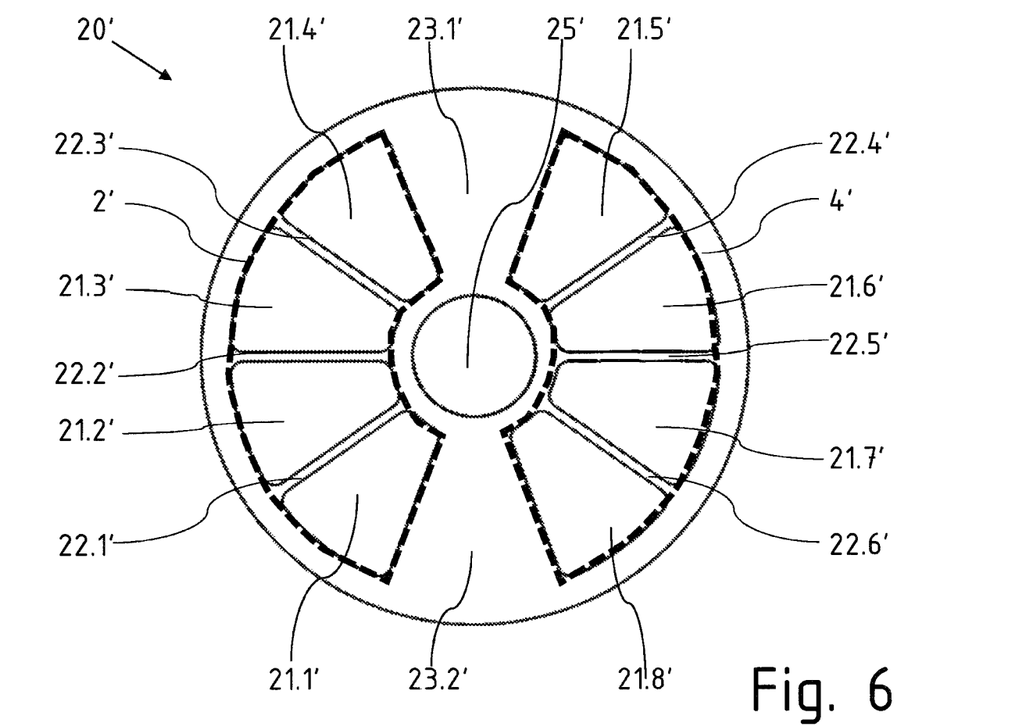
FIG. 6 shows, in plan view, a screen wheel for the filtering device according to the exemplary embodiment.

The screen wheel 20' is shown in plan view in FIG. 6. Again, the basic configuration provides for the division of a circular ring zone around a central hub 25' into n circular ring segments of equal size. In the illustrated exemplary embodiment, n=10 was selected, with the result that each segment includes an angle of 36°.

Two segments at diametrically opposite positions at 12 o'clock and 6 o'clock each form a blocking segment 23.1', 23.2'. The blocking segments 23.1', 23.2' divide the screen wheel 20' into two filter groups 2', 4' with in each case four screen cavities 21.1', . . . , 21.4', 21.5', . . . , 21.8'. These have in each case one screen opening which extends through the entire width of the screen wheel 20' and which can be covered by an insertable filter element or screen element.

The screen cavities 21.1', . . . , 21.4' and 21.5', . . . , 21.8' situated one next to the other in each case form a filter group 2' and 4', respectively, which can be flowed through as a whole unit, although each screen cavity 21.1', . . . , 21.8' is individually delimited at its periphery. The delimitation is made up of an inner arcuate portion, an outer arcuate portion and two radial sealing webs 22.1', . . . , 22.6. Adjacent screen cavities 21.1', . . . , 21.4' and 21.5', . . . , 21.8' have a common radial sealing web between them. Boundary-side screen cavities 21.1', 21.4' and 21.5', 21.8' are moreover outwardly delimited by radial edges of the in each case adjacent blocking segment 23.1', 23.2'.

Figure 7:
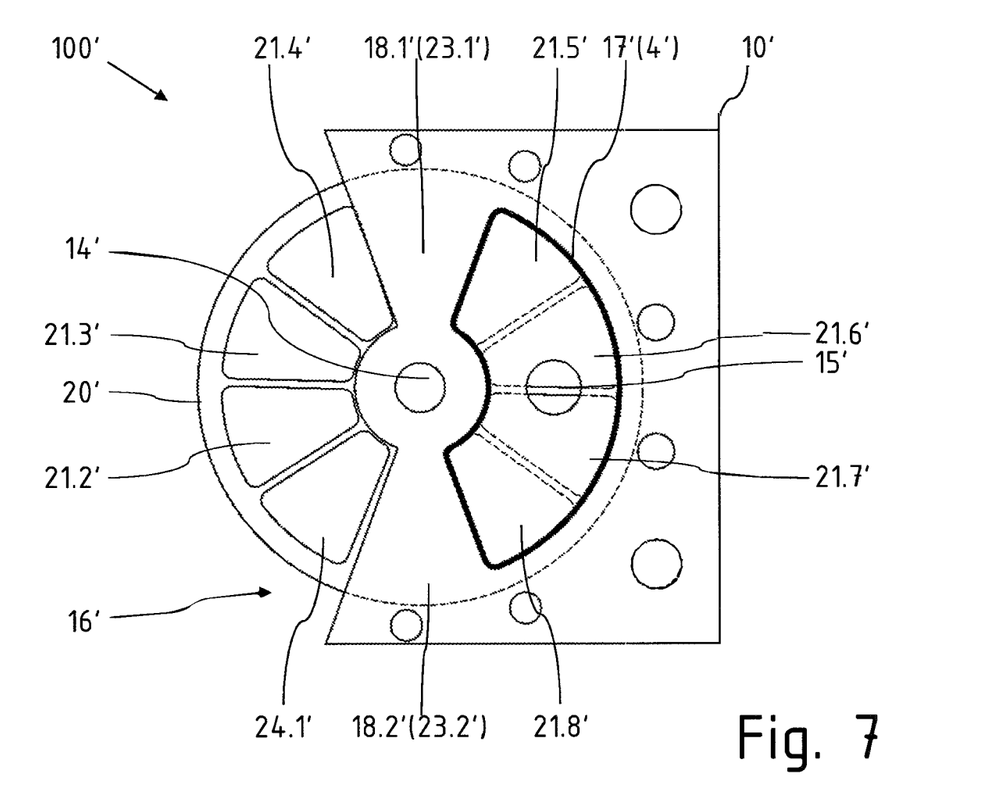
FIG. 7 shows a front view of the filtering device according to FIG. 5 with a first position of the screen wheel.

FIG. 7 illustrates the screen wheel 20' within the housing 10' in a side view, specifically during the filtering operation of the filtering device 100'. The left-hand filter group 2', with the four screen cavities 21.1', . . . , 21.4', is fully exposed in the maintenance position 16'. Blocking regions 18.1', 18.2' are formed on the housing outer boundary, in each case above and below the axis of rotation 14'. The blocking segments 23.1', 23.2' of the screen wheel 20' are in a state of sealing abutment in said blocking regions. Consequently, in turn, the other filter group 4', which, with its screen cavities 21.5', . . . , 21.8', is situated completely within the filtering region 17' in the housing 10', is laterally sealed off. The screen cavities 21.5', . . . , 21.8' of the filter group 4' are flowed through together, proceeding from the inflow channel 15'.

Figure 8:
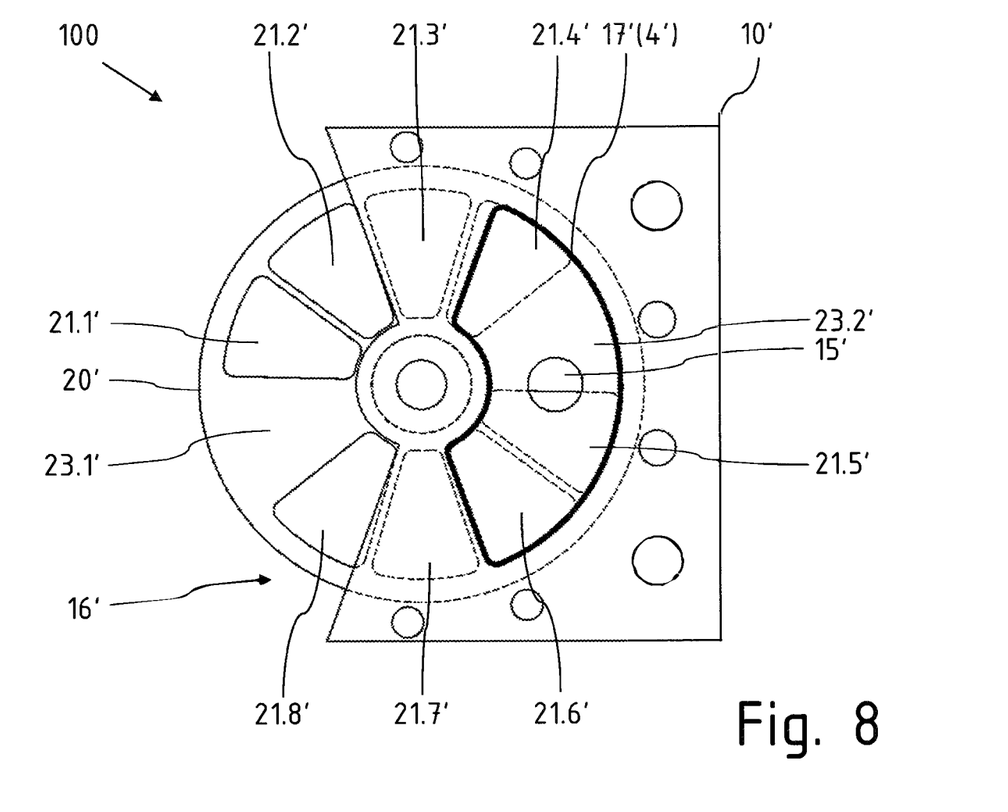
FIG. 8 shows a front view of the filtering device according to FIG. 5 with a second position of the screen wheel.

For the position of the screen wheel 20' shown in FIG. 8, rotation through three segment increments has been realized in comparison with FIG. 7. Although, in this intermediate position too, maintenance for the screen cavities 21.1', 21.2', 21.8' positioned within the maintenance opening 16' could also already be performed, it is preferable for the screen wheel 20' always to be rotated through in each case 180°, so that the position of the filter groups 2', 4' is swapped and it is always the case that all the screen cavities are positioned either in the filtering region 17' or in the maintenance opening 16'. The position of the screen wheel 20' according to FIG. 8 therefore constitutes merely a through-passage position. What is essential for the invention, however, is that, in this and other intermediate positions, a flow through multiple screen cavities remains possible at all times in the filtering region 17'. At most one of the two blocking segments 23.1, 23.2 can pass into the filtering region, and so, in all the screen wheel positions, there remain 3 of 4 screen cavities which can be flowed through and thus there is always—based on the segmentation selected here for the exemplary embodiment—at least 75% of the surface in the filtering region 17' available.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A filtering device for viscous media, the filtering device comprising:
   a housing that has a front housing element with at least one inflow channel and has a rear housing element with at least one outflow channel;
   a screen wheel mounted rotatably between the front and rear housing elements and has a number n of screen cavities, which are each to be provided with at least one screen insert element and, for sealing with respect to the front and rear housing elements, are each surrounded by at least one sealing web;
   a filtering region covered by the housing and has a flow connection with the at least one inflow channel and the at least one outflow channel and in which at least one screen cavity is flowed through;
   a maintenance region in which at least one screen cavity is exposed outside the housing and/or is accessible from a housing outer side; and
   two blocking regions in the housing that are each formed between the filtering region and the maintenance region and in which, in each case, at least one screen cavity together with the at least one sealing web is covered completely by the front and rear housing elements and has no flow connection with the at least one inflow channel and the at least one outflow channel,
   wherein, on the screen wheel, multiple screen cavities situated one next to the other are combined to form at least one filter group, which, in the case of at least partial overlapping with the filtering region of the housing, are flowed through in a joint manner, wherein an area on the screen wheel which is covered by the filtering region of the housing is larger than a single one of the screen cavities, wherein, next to each side of the at least one filter group, provided the screen wheel has at least one closed blocking segment which, when the screen wheel is rotated so that the at least one closed blocking segment of the screen wheel is positioned in the blocking regions of the housing, the at least one closed blocking segment is sealed off with respect to the front and rear housing elements on both sides of the screen wheel, and wherein the blocking regions in the housing are each larger than or equal in size to a single one of the screen cavities together with the at least one sealing web.

2. The filtering device as claimed in claim 1, wherein in the filtering region, a surface of each of the front and rear housing elements that faces toward the screen wheel has one planar depression or at least one overflow channel.

3. The filtering device as claimed in claim 1, wherein the at least one closed blocking segment takes up a smaller area on the screen wheel than the at least one filter group.

4. The filtering device as claimed in claim 1, wherein, in the maintenance region, there is provided a housing opening which is larger than or equal in size to a single one of the screen cavities.

5. The filtering device as claimed in claim 1, wherein the screen insert elements in the screen cavities and associated recesses in side surfaces of the screen wheel are shaped as circular segments.

6. The filtering device as claimed in claim 1, wherein the screen wheel is subdivided into circular ring segment surfaces of differing size, wherein the circular ring segment surface(s) serving as the at least one closed blocking segment are larger than the screen cavities of the circular screen segment surfaces in the at least one filter group.

7. The filtering device as claimed in claim 1, wherein the screen insert elements in the screen cavities and associated recesses in side surfaces of the screen wheel are round.

8. The filtering device as claimed in claim 1, wherein the screen wheel is subdivided into n circular ring segment surfaces, where $n \geq 6$, and wherein three of the circular ring segment surfaces situated one next to the other are closed blocking segments that form a common blocking segment, and n−3 of the circular ring segment surfaces form the at least one filter group.

9. The filtering device as claimed in claim 8, wherein a housing opening which has a size of one of the circular ring segment surfaces is provided in the maintenance region.

10. The filtering device as claimed in claim 8, wherein the number of circular ring segment surfaces is n=8 to 12.

11. The filtering device as claimed in claim 1, wherein the screen wheel is subdivided into n circular ring segment surfaces, where $n \geq 6$, wherein, the at least one filter group is formed as a first filter group and a second filter group with the first filter group being provided on a diametrically opposite side of the screen wheel as the second filter group, the first and second filter group each comprising at least two screen cavities situated one next to the other, wherein between the first and second filter groups, at least one circular ring segment surface is formed as the at least one closed blocking segment; and wherein a housing opening which is larger than or equal in size to the first or second filter group is provided in the maintenance region.

12. The filtering device as claimed in claim 11, wherein, in a working position for the filtering operation, all of the screen cavities, which are configured to be occupied by screen insert elements, are arranged either in the first or second filter group situated in the filtering region or in the other of the first or second filter group situated in the maintenance region.

* * * * *